Jan. 13, 1959     T. J. SCHULTZ     2,868,894
MINIATURE CONDENSER MICROPHONE
Filed Sept. 14, 1955

INVENTOR.
Theodore J. Schultz
BY

2,868,894
MINIATURE CONDENSER MICROPHONE

Theodore J. Schultz, Santa Monica, Calif., assignor to the United States of America as represented by the Secretary of the Navy Application September 14, 1955, Serial No. 534,413

5 Claims. (Cl. 179—111)

This invention relates to condenser microphones and, in particular, to certain refinements in structure that effect a greater fidelity to pressure signal reception throughout the audio frequency range with respect both to voltage amplitude and phase response.

Microphones of the condenser type operate on the principle that a variation in the electrode spacing of a small condenser causes a corresponding change in the electrical capacitance. Heretofore, condenser microphones have commonly been made with a heavy metal backplate which acts as the fixed electrode of the condenser. In front of this is stretched a thin, (0.001″–0.002″) movable, conducting membrane responsive to pressure variations in the sound field; the motion of this membrane causes the capacitance between the membrane and backplate to vary in correspondence with the acoustical pressure. This diaphragm has hitherto usually consisted of a tightly stretched, thin, metal sheet.

The invention to be described employs a very thin, very light plastic membrane coated with a thin conducting layer; it is not stretched particularly taut but, rather, relies for stiffness upon the air trapped in the cavity behind it. Moreover, the significant variable capacitance is comprised, not between the membrane and the backplate of the cavity, but between the membrane and an acoustically transparent electrode introduced specifically in order that the fundamental resonance frequency and the microphone sensitivity (which otherwise are interrelated) may be adjusted independently of one another. The electrical signal from the microphone may be obtained by any of the conventional methods (i. e., through a bridge circuit, by frequency modulation methods, or by the more common use of a D. C. bias voltage). The sensitivity is of the same order of magnitude as conventional laboratory standard microphones; the chief advantages lie in the small size and the regularity and wide range of its response.

The resonance phenomenon associated with the moving diaphragm of a condenser microphone tends to detract from the fidelity of response by introducing a "peak" in the amplitude frequency response; at frequencies above this peak the response falls rapidly. Consequently, it is desirable to raise this fundamental resonance frequency as much as possible. Ideally, it would be placed so that the entire audio spectrum lies below it. In order to raise the resonance frequency to an acceptable value, the diaphragm of a condenser microphone is usually tightly stretched; for the stiffer the diaphragm, the higher the resonance frequency. As a corollary, the stiffer the diaphragm, the less it will move in response to a given force so that the sensitivity of the condenser microphone is decreased. It is seen, therefore, that an improvement in the "flat" range of the condenser microphone can be attained only at the cost of reduced sensitivity. A further effect of stretching the membrane tightly is that this tension tends to prevent the collapse of the diaphragm against the backplate under the electrostatic attraction caused by the application of a high D. C. bias voltage in circuits where this is used.

There is, of course, a practical limit to the amount of stress which a diaphragm can tolerate before rupturing. If the restoring force of the system is provided by the stiffness of the air cavity, however, the diaphragm need hardly be stretched at all. Moreover, there is another advantage to be realized by this step, namely, the more favorable shape assumed by the membrane in vibration. When the chief stiffness of the system is contributed by the tension in the membrane, the shape of the membrane is curved (taking a meniscuslike shape; the exact shape may be expressed as a series of Bessel functions), the center moving with considerably greater amplitude than the regions near the circumference. But when the stiffness is provided by the air cavity, the membrane moves as a plane (except very near the points of support), all parts of it moving with the same amplitude. Thus, the stiffness of the system is hardly affected when the membrane is supported at the center and one loses very little sensitivity in this case since all portions of the membrane move with the same high amplitude as did the center in the unsupported case.

It is an object of this invention to provide a condenser microphone having uniform voltage amplitude and phase responses within substantially the entire audio frequency spectrum without sacrificing reasonably high sensitivity.

It is a further object of the invention to provide a condenser microphone in which a flexible diaphragm is controlled by air stiffness.

It is another object of the invention to provide a condenser microphone construction in which it is possible to control independently the volume of a back cavity, the electrode spacing, the membrane tension and the amount of viscous damping.

A further object of the invention is to provide a condenser microphone whose response characteristics remain relatively immune to the effects of changing humidity, temperature and atmospheric pressure.

A further object of the invention is to provide a condenser microphone whose upper frequency range has been extended by fixing the center of the diaphragm, thus making this center area inactive and relatively unresponsive to the pressure rise (which occurs most strongly at the center of the microphone) due to obstacle effects. This is made possible without serious loss of sensitivity bu using the air cavity rather than the membrane tension to provide the stiffness of the system.

Other objects and many of the attendant advantages of this invention will be readily appreciated as it becomes better understood by reference to the following detailed description when considered in connection with the accompanying drawings wherein.

Figure 1:
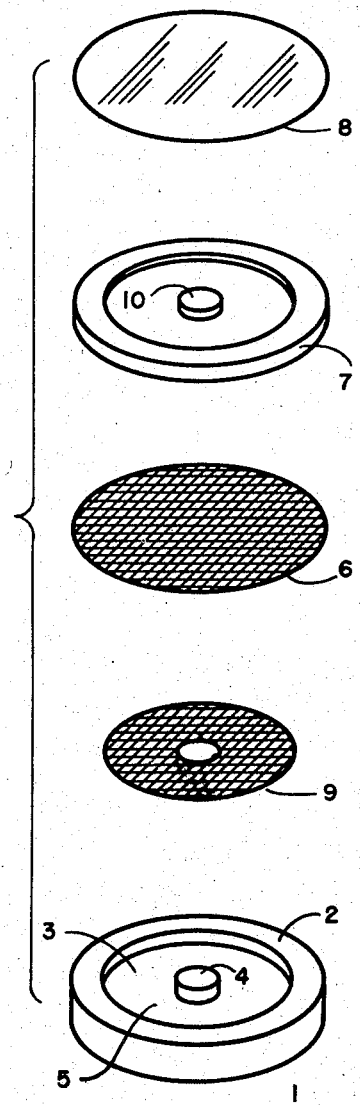
Fig. 1 is an exploded perspective view of a condenser microphone constructed in accordance with the invention.

Referring now to Fig. 1, there is depicted a disk 1 having a rim 2, a back wall 3, and a cylindrical core 4, defining an annular air cavity 5, a stationary electrode 6 of fine wire gauze, an insulating spacer 7, and a membrane 8. The gauze which constitutes the stationary electrode 6 is preferably a fine Phosphor bronze cloth about .005″ thick and having 200 wires per inch. The gauze should be rolled under high pressure to a uniform thickness of .0015 to .0018″, thus flattening the wires and diminishing the open area in the mesh. The gauze thus processed is flattened so effectively that although it remains acoustically transparent and to some extent optically transparent, it is possible when the gauze is stretched to catch an undistorted specular reflection from the rolled surface, as though it had been polished. This degree of smoothness is desirable because of the small spacing which will exist between the membrane 8 and the stationary electrode 6. Any abrupt irregularity in spacing tends to distort the uniformity of the electric field and constitutes a point of intense attraction at which diaphragm collapse may begin. Stretching of the gauze electrode before securing it to the disk 1 is desirable to guarantee a flat surface and to insure that the electrode 6 be truly stationary.

The gauze electrode 6 is attached to the face of rim 2 and core 4 by any suitable means, such as solder. Care should be exercised when using solder, in order that the specularly smooth gauze surface not be marred by irregularities. A barely discernible quantity of solder is sufficient, amounting to little more than a discoloration of the gauze.

An annular insulating spacer 7 of such size as to cover the frontal area of rim 2 (but not the core 4) is cemented over the gauze electrode 6. The spacer 7 is made of an insulating material, preferably polyethylene terephthalate. The plastic membrane 8 is then cemented onto the spacer 7. The membrane may be selected from materials such as vinylidene chloride or polyethylene terephthalate, which have low specific gravity and high tensile strength. Polyethylene terephthalate is preferred because of its remarkable tensile properties and because only it can be obtained in the form of a film as thin as .00025". After the diaphragm 8 has been cemented in place and while under mild tension, a thin coating of a conductive material (such as colloidal graphite) is applied thereto.

Viscous damping due to the motion of air in the cavity 5 can be increased to a certain extent by filling the cavity with a number of very thin washers made from the flattened fine wire gauze, such as the washer 9 shown in Fig. 1. The motion of the air through the fine mesh of the gauze washers introduces dissipation. This damping is quite effective in eliminating the first major resonance peak of the condenser microphone although the reduction in the volume of the back cavity caused by the addition of the washers reduces the sensitivity slightly.

The back cavity of the microphone may be made completely airtight; but if this is done, barometric variations and changes of temperature will cause the equilibrium position of the membrane to shift, resulting in variations in microphone sensitivity. It is desirable, therefore, to vent the back cavity through a "slow leak," which will permit an equalization of the external and internal static pressures but which will not reduce the effectiveness of the cavity for signal frequencies. This may be accomplished by drilling a small hole through the wall of disk 1, but the simplest and most direct solution has proved to be a tiny, almost invisible, slit in the membrane itself at the very edge of the peripheral spacer. The latter solution is completely effective in stabilizing microphone sensitivity and does not alter the frequency response of the microphone in any respect within the audio frequency range.

Figure 3:
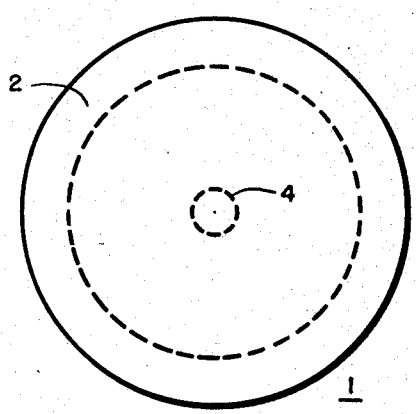
Fig. 3 is a front elevational view of the microphone shown in Fig. 2.
Figure 2:
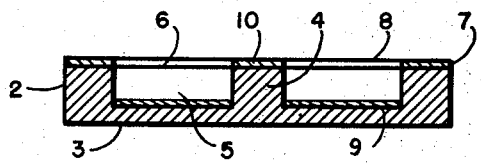
Fig. 2 is a vertical sectional view of an assembled microphone embodying the invention.

The condenser microphone thus far described may be modified by supporting the center of the membrane 8 by means of an insulating spacer 10 (Fig. 2) cemented atop the core 4. Supporting the center of the membrane increases the stiffness of the system only very slightly since the major portion of the stiffness comes from the air cavity, but it contributes the following desirable features: (a) resonance is moved to a slightly higher frequency; (b) the susceptibility to the effect of electrostatic attraction, which was increased by the tiny slit in the membrane, is now made negligible; and (c) the effect of pressure increase at the face of the microphone due to obstacle effects is virtually eliminated. This last improvement is particularly helpful; it arises because the obstacle effects, when they first appear with rising frequency, make themselves felt first at the center where the membrane is fixed.

It has been determined experimentally that as the depth of the cavity 5 is increased, the frequencies at which resonance occurs decrease until a point is reached where further increase in cavity depth does not appreciably affect the resonance frequencies. At this point the membrane tension is controlling the stiffness of the system. It should be appreciated that the shallower the cavity the more the diaphragm will be stiffened by the air and, consequently, the less sensitive will the microphone be. The depth of the cavity 5 is selected by a compromise so that the condenser microphone has an acceptably high resonance frequency and thus a "flat" frequency response with reasonably high sensitivity. For example, a microphone in accordance with the invention was constructed from a brass disk ½" in diameter having a cavity ⅜" in diameter, a core ¹⁄₁₆" in diameter and a cavity depth of .045". This microphone gave extremely uniform response (±1 db) to 15 kc./sec., with a sensitivity of −63 db with respect to 1 volt/dyne/cm.².

Obviously many modifications and variations of the present invention are possible in the light of the above teachings. It is therefore to be understood that within the scope of the appended claims the invention may be practiced otherwise than as specifically described.

What is claimed is:

1. A condenser microphone comprising, in combination, a hollow, cylindrical cavity member, said member consisting of a base portion and a circular wall section extending therefrom, a fine wire gauze closing said cavity member and secured to the top of said wall section, said fine wire gauze acting as one electrode of said condenser microphone, an insulating washer positioned on top of said fine wire gauze, said washer having a diameter corresponding to that of said cylindrical cavity member and a width substantially equal to the thickness of said circular wall section, and a plastic diaphragm secured to said washer so as to have its peripheral edge stationary when said diaphragm is set into vibration in response to the impingement thereon of external pressure waves, and an electrically conductive coating applied to that surface of said diaphragm which is remote from said fine wire gauze, said conducting surface acting as the second electrode of said condenser microphone.

2. A condenser microphone comprising, in combination, a hollow, cylindrical cavity member, said member being composed of a base portion and a circular wall section formed integrally therewith, a concentric boss extending from said base portion to the same height as said wall section, a fine wire gauze secured to the free end of said boss and the top of said wall section, said fine wire gauze acting as one element of the condenser microphone, electrically insulating means secured to said fine wire gauze at those points whereat said gauze comes in contact with said wall section and said boss, a plastic diaphragm secured to said insulating means so as to be free to vibrate in response to pressure waves incident thereupon with its edge and its central portion fixed and an electrically conductive coating adhering to that surface of said plastic diaphragm which is remote from said fine wire gauze, said conductive surface performing as the other electrode of said condenser electrode.

3. A condenser microphone comprising a housing having a cavity therein and a centrally disposed core, a metallic gauze electrode secured at its periphery to said housing and at its center to said core, said metallic gauze covering said cavity and acting as one plate of a condenser, a plastic diaphragm insulated from said metallic gauze, said diaphragm having its periphery and its center core effectively clamped to said metallic gauze and an electrically conducting coating applied to that surface of said plastic diaphragm which does not confront said metallic gauze, said conducting coating acting as the other plate of said condenser.

4. A condenser microphone comprising, in combination, a housing having a cavity therein and a centrally disposed core, an acoustically transparent metallic electrode secured at its periphery to said housing and at its center to said core, said metallic electrode covering said cavity and forming one plate of a condenser, a vibratile diaphragm, an insulator secured to the peripheries and the central portions of said metallic electrode and said diaphragm for maintaining said metallic electrode and said diaphragm in a parallel spaced relationship, an electrically conductive coating applied to that surface of said diaphragm which faces away from said metallic electrode, said electrically conductive coating forming the other plate of said condenser.

5. In an arrangement as defined in claim 4 wherein a wire gauze washer is positioned within said cavity with said centrally disposed core passing through its aperture, said washer serving as a damping means for said condenser microphone.

References Cited in the file of this patent

UNITED STATES PATENTS

| | | |
|---|---|---|
| 1,488,565 | Stewart et al. | Apr. 1, 1924 |
| 1,585,333 | Massolle et al. | May 18, 1926 |
| 1,592,059 | Wiggins | July 13, 1926 |
| 2,238,741 | Lauffer | Apr. 15, 1941 |
| 2,396,825 | Burroughs | Mar. 19, 1946 |
| 2,787,671 | Grosskopf | Apr. 2, 1957 |

FOREIGN PATENTS

| | | |
|---|---|---|
| 463,937 | Germany | Aug. 14, 1928 |